US012537152B2

(12) United States Patent
Serizawa et al.

(10) Patent No.: US 12,537,152 B2
(45) Date of Patent: Jan. 27, 2026

(54) SWITCH DEVICE

(71) Applicant: Valeo Japan Co., Ltd., Saitama (JP)

(72) Inventors: Yasumasa Serizawa, Tokyo (JP); Yuya Numata, Tokyo (JP)

(73) Assignee: VALEO JAPAN CO., LTD. (JP)

( * ) Notice: Subject to any disclaimer, the term of this patent is extended or adjusted under 35 U.S.C. 154(b) by 256 days.

(21) Appl. No.: 18/226,531

(22) Filed: Jul. 26, 2023

(65) Prior Publication Data

US 2024/0038468 A1    Feb. 1, 2024

(30) Foreign Application Priority Data

Jul. 26, 2022    (JP) ................. 2022-118539

(51) Int. Cl.
*H01H 36/00*    (2006.01)
*H01H 9/02*    (2006.01)

(52) U.S. Cl.
CPC ............. *H01H 36/00* (2013.01); *H01H 9/02* (2013.01)

(58) Field of Classification Search
CPC .. H01H 36/00; H01H 36/0033; H01H 36/004; H01H 36/02; H01H 36/0006; H01H 36/0013; H01H 9/00; H01H 9/02; H01H 3/00; H01H 3/02; H01H 3/08; H01H 3/12; H01H 3/04; H01H 13/00; H01H 13/14; H01H 1/20; H01H 2050/025; H01H 36/0026; H01H 50/023; H01H 50/36; H01H 50/60; H01H 51/28

USPC ....................................................... 200/237
See application file for complete search history.

(56) References Cited

U.S. PATENT DOCUMENTS

| 2008/0224803 | A1 | 9/2008 | Nakayama |
| 2008/0284549 | A1* | 11/2008 | Bedell ............... H03K 17/9502 335/170 |
| 2017/0354023 | A1* | 12/2017 | Dimberg ............... H05B 47/19 |

FOREIGN PATENT DOCUMENTS

| DE | 102006036143 A1 | 2/2008 | |
| EP | 3707475 B1 | 9/2020 | |
| JP | 5194860 B2 | 5/2013 | |
| WO | WO-2019091611 A1 * | 5/2019 | ........... H01H 36/002 |

OTHER PUBLICATIONS

Extended European Search Report, EP23183358, dated Nov. 9, 2023.
Machine English translation for DE102006036143.

* cited by examiner

*Primary Examiner* — Anthony R Jimenez
(74) *Attorney, Agent, or Firm* — Fishman Stewart PLLC

(57) ABSTRACT

A switch device may include a movable body that is displaced in an axial direction in conjunction with an operation of an operated portion, a magnet provided on the movable body, and a plurality of detection elements arranged facing the magnet. The plurality of detection elements may include a first detection element with a detection surface facing the magnet and a reversed second detection element with a detection surface facing away from the magnet. The total number of the plurality of detection elements may be at least three.

7 Claims, 8 Drawing Sheets

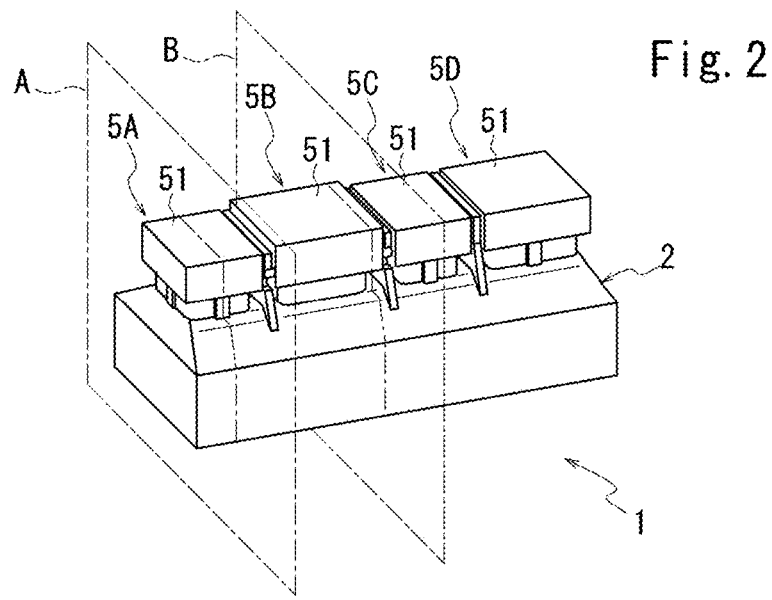
Fig. 2
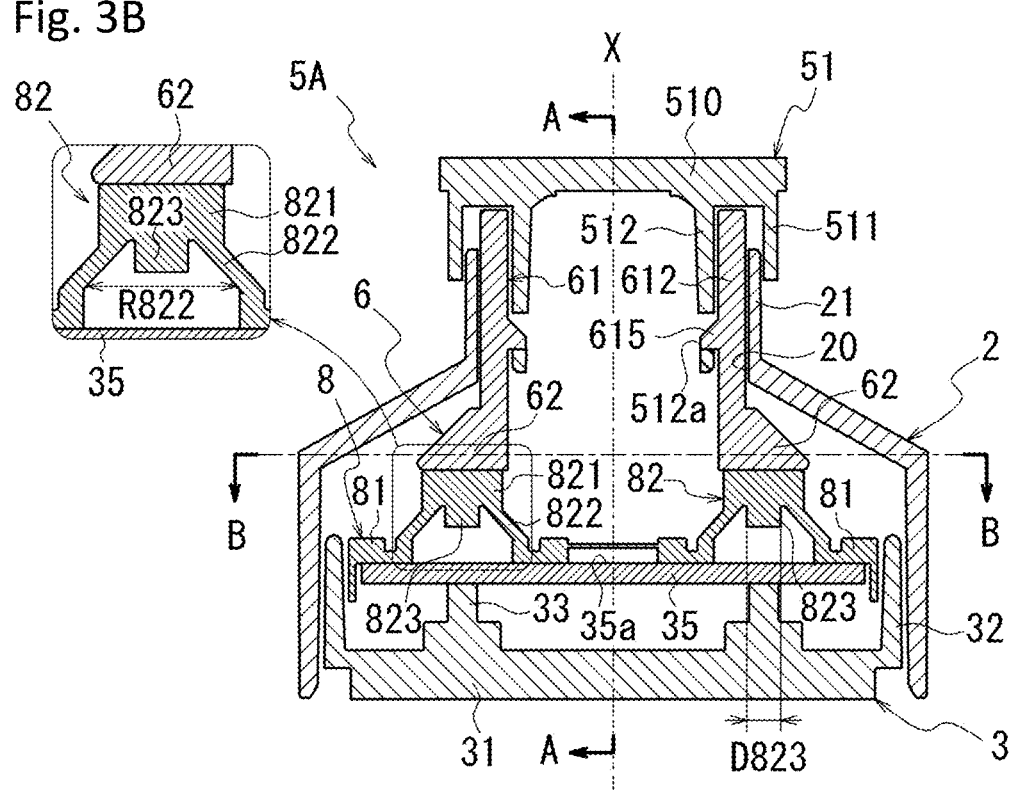
Fig. 3B
Fig. 3A

OPERATION OF THE SWITCH

<MAGNETIC FORCE SENSOR 7A>

<MAGNETIC FORCE SENSOR 7B>

<MAGNETIC FORCE SENSOR 7C>

SWITCH DEVICE

CROSS-REFERENCE TO RELATED APPLICATION

This application claims priority to Japanese Patent Application No. JP2022-118539 filed on Jul. 26, 2022, the contents of which are hereby incorporated by reference in its entirety.

TECHNICAL FIELD

The present invention relates to a switch device for vehicles.

BACKGROUND

Patent Literature 1 discloses a switch for vehicles.

PATENT LITERATURE

Patent Literature 1: JP5194860B

The switch for vehicles of Patent Literature 1 has an operating body that advances and retreats in conjunction with an operation of the brake pedal. A magnet is attached to the operating body. The magnet is displaced in an advancing and retreating direction of the operating body in conjunction with an operation of the brake pedal. The switch for vehicles has one detection means disposed facing the magnet.

The detection means detects ON/OFF of the switch for vehicles on the basis of changes in magnetism when the magnet advances and retreats.

In this type of the switch for vehicles, when a failure occurs in the detection means, it affects detection of ON/OFF operation of the switch. Therefore, it is required that operation detection of the switch is not affected even when the detection means fails.

SUMMARY

The present invention is a switch device configured to include: a movable body that is displaced in an axial direction in conjunction with an operation of an operated portion; a magnet provided on the movable body; and a plurality of detection elements arranged facing the magnet, in which the plurality of detection elements include a detection element with a detection surface facing the magnet and a reversed detection element with the detection surface facing away from the magnet, and the total number of the plurality of detection elements is at least three.

According to the present invention, it is possible to suppress influence on operation detection of the switch device even when some of the detection elements fail.

BRIEF DESCRIPTION OF THE DRAWINGS

FIG. 2 is a perspective view of the switch device.
FIG. 3A is a cross-sectional view of the switch device.
FIG. 3B is an enlarged portion of the cross-sectional view of the switch device shown in FIG. 3A.

DETAILED DESCRIPTION

An embodiment of a switch device 1 according to the present invention will be described below.

Figure 1:
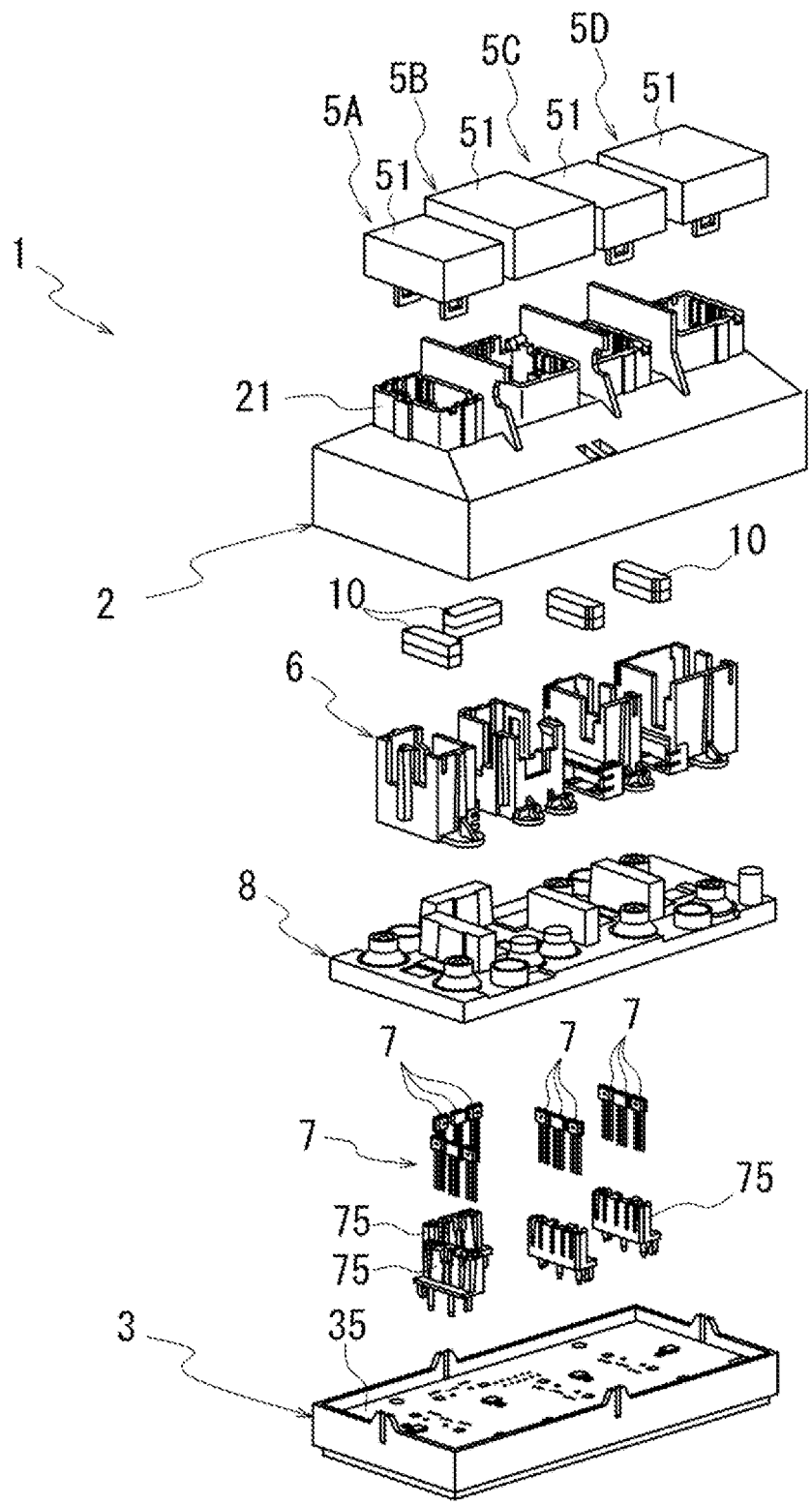
FIG. 1 is an exploded perspective view of a switch device.
Figure 4:
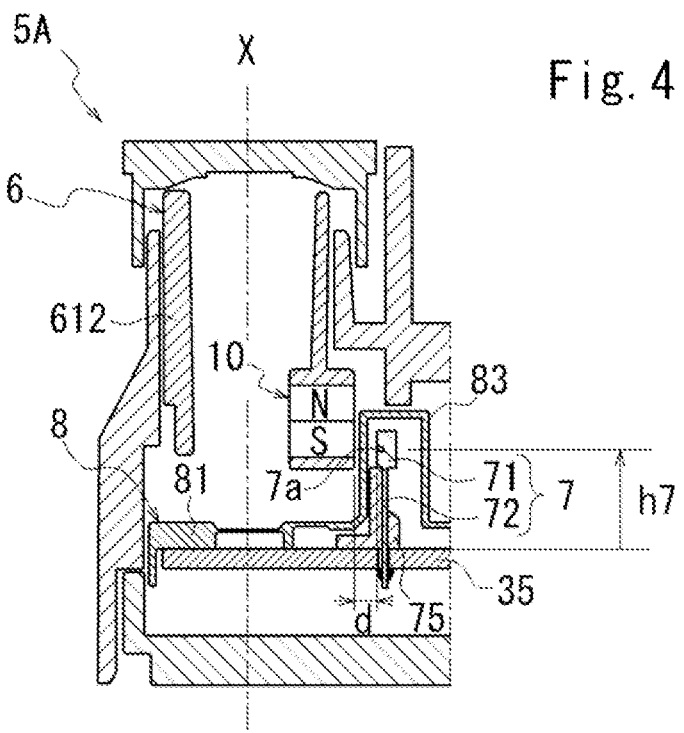
FIG. 4 is a cross-sectional view of the switch device.
Figure 5:
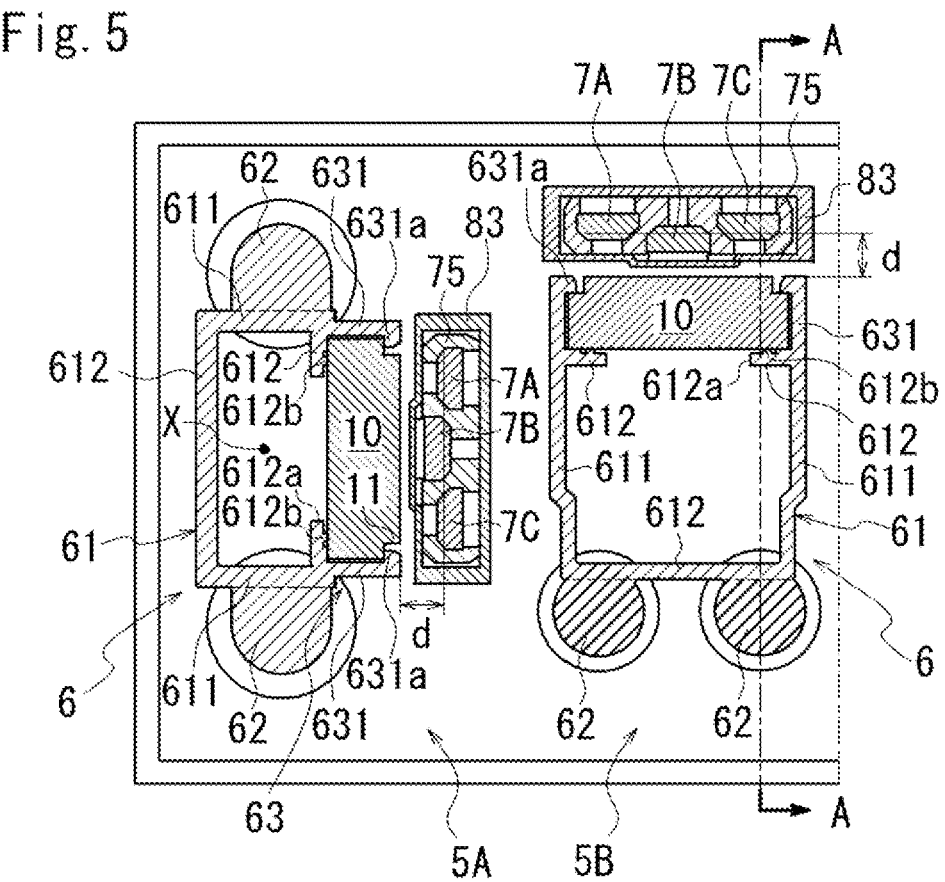
FIG. 5 is a cross-sectional view of the switch device.

FIG. 1 is an exploded perspective view of the switch device 1. FIG. 2 is a perspective view of the switch device 1. FIG. 3A is a cross-sectional view of the switch device 1. FIG. 3A is a diagram schematically illustrating a cross-section of a switch 5A of the switch device 1 taken along a plane A in FIG. 2. FIG. 4 is a cross-sectional view of the switch device 1. FIG. 4 is a diagram schematically illustrating a cross-section of the switch 5A taken along a line A-A in FIG. 3A. FIG. 5 is a cross-sectional view of the switch device 1. FIG. 5 is a diagram schematically illustrating a cross-section of the switch device 1 taken along a line B-B in FIG. 3A. FIG. 5 illustrates a range from the switch 5A to a switch 5B.

As illustrated in FIG. 2, the switch device 1 includes a total of four switches 5 (5A to 5D).

An operated portion 51 of each switch 5 (5A to 5D) is exposed on an upper portion of a case 2.

Different functions are assigned to each of the switches 5 (5A to 5D).

As an example, when the switch device 1 is a switch device used to specify a running mode of a vehicle, functions such as parking (P), reverse running (R), neutral (N), and forward running (D) are assigned to these switches 5A to 5D one by one.

In the switch device 1, when any one of the switches 5A to 5D is pressed, a function assigned to the pressed switch 5 is specified, and a specification of a function specified so far is supposed to end.

As illustrated in FIG. 3A, the switch 5A includes the operated portion 51 that is operated by a user, and a movable body 6 that is displaced in conjunction with an operation of the operated portion 51.

As illustrated in FIG. 4, the switch 5A further includes a magnet 10 attached to the movable body 6 and a magnetic force sensor 7 (Hall IC: detection element) that detects changes in magnetic force of the magnet 10 due to displacement of the movable body 6.

As illustrated in FIG. 1, three magnetic force sensors 7 are provided for each switch 5 (5A to 5D). In the present embodiment, the three magnetic force sensors 7 assigned to the same switch are attached to a printed circuit board 35 via one support 75. The printed circuit board 35 is shared by the four switches 5 (5A to 5D). Therefore, a total of four supports 75 are provided on the printed circuit board 35.

The printed circuit board 35 is housed inside a cover 3 closing a lower opening of the case 2. As illustrated in FIG. 3A, the cover 3 has a bottom wall portion 31 and a peripheral wall portion 32 surrounding an outer periphery of the bottom wall portion 31 over the entire circumference. The peripheral wall portion 32 is provided in a direction substantially orthogonal to the bottom wall portion 31. The peripheral wall portion 32 is formed to have the same height over the entire circumference in the circumferential direction.

The cover 3 is attached to the case 2 with screws (not illustrated) with the peripheral wall portion 32 fitted into the lower opening of the case 2.

A support base 33 for the printed circuit board 35 is provided inside the peripheral wall portion 32. The support base 33 protrudes in the same direction as the peripheral wall portion 32. A plurality of support bases 33 are provided on the bottom wall portion 31. The printed circuit board 35 is placed on upper ends of the support bases 33. A cover member 8 including an elastic material is placed on the printed circuit board 35.

As illustrated in FIG. 1, the switches 5A, 5C, and 5D are push type switches and have the same basic configuration. The switch 5B is a swinging switch. A basic configuration of the switch 5B is the same as that of the switch 5A, but a detailed shape of the movable body 6, which will be described below, is different from that of the movable body 6 of the switch 5A.

Hereinafter, the basic configuration of the switch 5A will be described as a representative of the switches 5A, 5C, and 5D.

As illustrated in FIG. 3A, the operated portion 51 of the switch 5A includes a pressed portion 510, a peripheral wall portion 511 surrounding an outer periphery of the pressed portion 510 over the entire circumference, and a connecting portion 512 extending in the same direction as the peripheral wall portion 511 inside the peripheral wall portion 511.

A through-hole 20 is provided in the upper portion of the case 2 to allow communication between an inside and an outside of the case 2. A peripheral wall portion 21 surrounding the through-hole 20 is provided on the upper portion of the case 2. The peripheral wall portion 21 extends linearly upwardly away from the printed circuit board 35. In the case 2, the peripheral wall portion 511 of the operated portion 51 is fitted outside the peripheral wall portion 21. Furthermore, in the case 2, a cylindrical wall portion 61 (a second wall portion 612) of the movable body 6 passes through an inside of the peripheral wall portion 21 in an axis X direction. Here, the axis X is a straight line orthogonal to an upper surface 35a of the printed circuit board 35 and a straight line in a displacement direction of the movable body 6.

The movable body 6 is supported by the peripheral wall portion 21 on the case 2 side so as to be movable in the axis X direction. In the movable body 6, the connecting portion 512 of the operated portion 51 is inserted inside the cylindrical wall portion 61 (the second wall portion 612). A protrusion 615 protruding from an inner periphery of the cylindrical wall portion 61 (the second wall portion 612) is engaged with an engaging hole 512a on a tip side of the connecting portion 512. In the present embodiment, the operated portion 51 and the movable body 6 are connected by engaging the protrusion 615 on the movable body 6 side with the engaging hole 512a. Thus, the movable body 6 can be displaced in the axis X direction in conjunction with a pressing operation for the operated portion 51.

As illustrated in FIG. 5, the cylindrical wall portion 61 on a left side of the figure is formed into a cylindrical shape including a pair of first wall portions 611 and 611 and second wall portions 612 and 612 connecting ends of the first wall portions 611 and 611 to each other. The cylindrical wall portion 61 has a substantially rectangular shape in a cross-sectional view. The cylindrical wall portion 61 is provided with contact portions 62 and 62 on both sides in a width direction (a vertical direction in the figure) of the cylindrical wall portion 61. The contact portions 62 and 62 bulge from outer peripheries of the first wall portions 611 and 611 in directions away from each other.

As illustrated in FIGS. 3A and 3B, the contact portions 62 and 62 are placed on placement portions 82 of the cover member 8.

Areas of the contact portions 62 and 62 to be placed on the placement portions 82 and 82 are formed in a substantially circular shape as viewed from the axis X direction (see FIG. 5).

As illustrated in FIG. 5, one of the second wall portions 612 and 612 is provided with a cutout portion 612a. In the cylindrical wall portion 61, a holding portion 63 for the magnet 10 is attached to the second wall portion 612 provided with the cutout portion 612a.

The holding portion 63 has a pair of locking arms 631 and 631. The locking arms 631 and 631 are provided in a symmetrical positional relationship with the cutout portion 612a interposed therebetween. In the second wall portion 612, protrusions 612b and 612b are provided in regions on the cutout portion 612a side as viewed from the locking arms 631 and 631. The protrusions 612b and 612b protrude in the same direction as the locking arms 631 and 631.

The locking arms 631 and 631 linearly extend in a direction away from the second wall portion 612. Clip portions 631a and 631a are respectively provided at tips of the locking arms 631 and 631. The clip portions 631a and 631a protrude in a direction to approach each other. The clip portions 631a and 631a are locked with a stepped portion 11 provided on the magnet 10. The magnet 10 is pressed against the protrusions 612b and 612b by a biasing force acting from the clip portions 631a and 631a.

FIG. 6 is a diagram illustrating a positional relationship between the magnet 10 and the magnetic force sensors 7 (7A, 7B, and 7C).

Figures 6A, 6B:
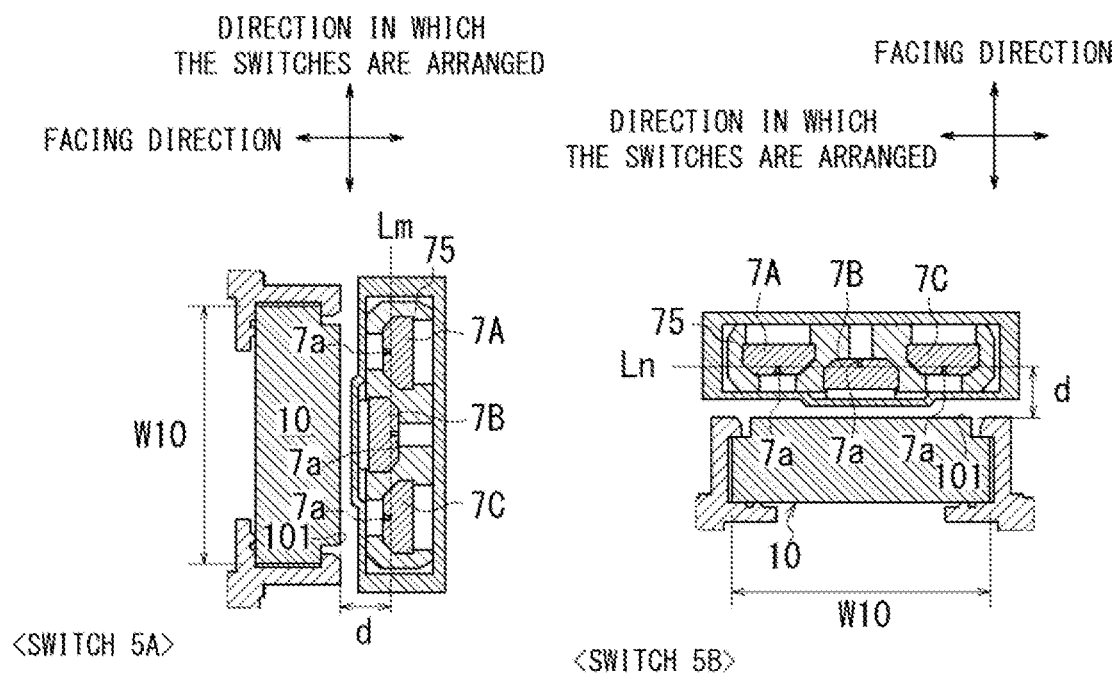
FIG. 6 is a diagram illustrating a positional relationship between a magnet and a magnetic force sensor.

FIG. 6A illustrates the positional relationship between the magnet 10 of the switch 5A and the magnetic force sensors 7 (7A, 7B, and 7C). FIG. 6B illustrates the positional relationship between the magnet 10 of the switch 5B and the magnetic force sensors 7 (7A, 7B, and 7C).

As illustrated in FIG. 4, the magnet 10 is provided and oriented so that an N pole is located on one side (an upper side in the figure) in the axis X direction and an S pole is located on the other side (a lower side in the figure).

The magnetic force sensors 7 (7A, 7B, and 7C) are arranged facing the magnet 10 laterally of the magnet 10.

The magnetic force sensor 7 has a detection portion 71 and a leg portion 72 extending from the detection portion 71.

As illustrated in FIG. 6A, the magnet 10 of the switch 5A has a width W10 in a direction (a vertical direction in the figure) orthogonal to a facing direction (a horizontal direction in the figure) of the magnet 10 and the magnetic force sensor 7.

In the present embodiment, the three magnetic force sensors 7 (7 A, 7 B, and 7 C) are prepared for one magnet 10. The magnetic force sensors 7 (7 A, 7 B, and 7 C) are supported by a common support 75. The leg portion 72 of each of the magnetic force sensors 7 (7A, 7B, and 7C) penetrates the printed circuit board 35 and is soldered to a back surface of the printed circuit board 35 (see FIG. 4).

In this state, a detection surface 7a of each of the magnetic force sensors 7 (7A, 7B, and 7C) is disposed at a position away from the printed circuit board 35 by a height h7.

As illustrated in FIG. 6A, the magnetic force sensors 7 (7A, 7B, and 7C) include the magnetic force sensors 7A and 7C provided with the detection surface 7a of the detection portion 71 facing the magnet 10, and a reversed magnetic force sensor 7B with the detection surface 7a facing away from the magnet 10. The detection surface 7a of each of the magnetic force sensors 7 (7A, 7B, and 7C) is positioned on a straight line Lm parallel to a facing surface 101 (a surface) of the magnet 10. The detection surface 7a is disposed at a position away from the facing surface 101 (the surface) of the magnet 10 by a distance d.

The magnetic force sensors 7 (7A, 7B, and 7C) are arranged at predetermined intervals along the straight line Lm. The straight line Lm is a straight line in an alignment direction of the magnetic force sensors 7 (7A, 7B, and 7C). As viewed from a facing direction of the magnetic force sensors 7 and the magnet 10, the magnetic force sensors 7 (7A, 7B, and 7C) are arranged in a positional relationship that overlaps the magnet 10. Therefore, the magnetic force sensors 7 (7A, 7B, and 7C) are arranged so as not to protrude in a direction of the straight line Lm beyond a range of the width W10 of the magnet 10.

As illustrated in FIGS. 4 and 5, the magnetic force sensors 7 (7A, 7B, and 7C) and the support 75 are housed in a housing portion 83 of the cover member 8 that covers the upper surface of the printed circuit board 35.

Figure 7:
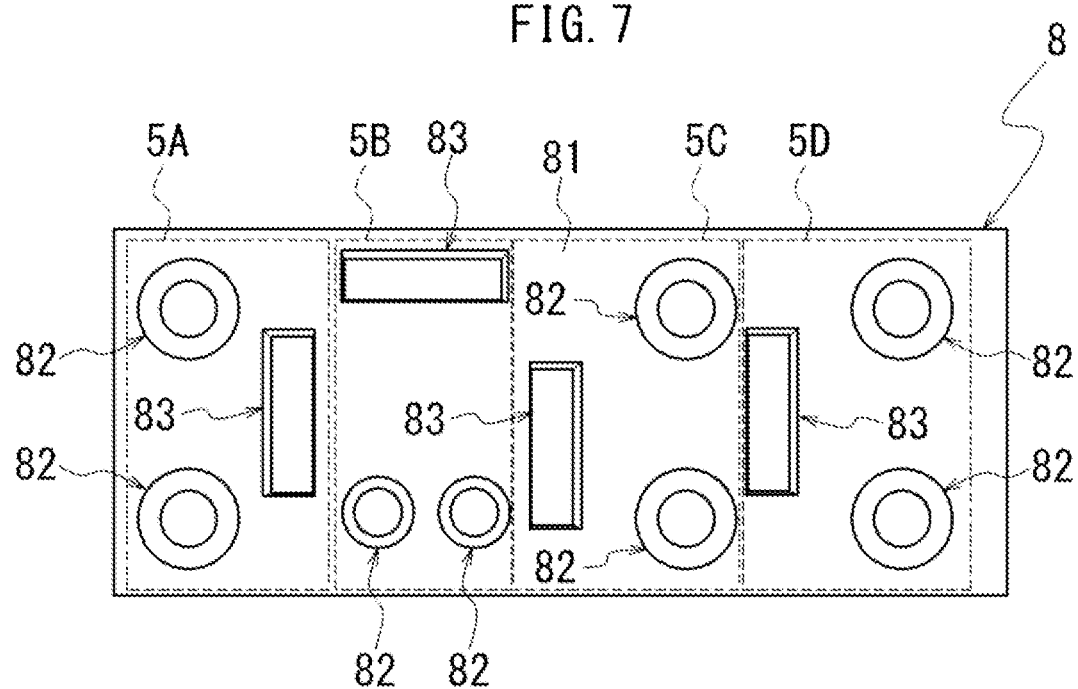
FIG. 7 is a diagram schematically illustrating a state in which a cover member is viewed from a case side.

FIG. 7 is a diagram schematically illustrating a state of the cover member 8 viewed from the case 2 side. In FIG. 7, for convenience of description, illustration of the fine irregularities on the surface of the cover member 8 is omitted and simplified. Furthermore, in FIG. 7, in order to illustrate a correspondence relationship between sites (placement portion 82, housing portion 83) protruding from a base portion 81 and the switches 5A to 5D, corresponding sites (placement portion 82, housing portion 83) are illustrated surrounded by dashed lines for each of the switches 5A to 5D.

As illustrated in FIG. 7, the cover member 8 has the base portion 81, the placement portion 82, and the housing portion 83. The cover member 8 is an integrated component formed of a flexible elastic material such as rubber. The cover member 8 is formed in a size capable of covering the upper surface of the printed circuit board 35 over the entire surface.

The base portion 81 is a portion that is placed on the printed circuit board 35 (see FIG. 3A). The placement portion 82 is a portion that supports the movable body 6 so as to be displaceable in the axis X direction (the vertical direction in the figure) (see FIGS. 3A and 3B). The housing portion 83 is a portion that houses the magnetic force sensors 7 and the support 75 (see FIG. 4).

As illustrated in FIG. 7, in the cover member 8, a pair of placement portions 82 and 82 and one housing portion 83 are assigned to one switch. In the figure, the placement portions 82 and 82 and the housing portion 83 within an area surrounded by the dashed line labeled with a reference numeral 5A are parts for the switch 5A. In the figure, the placement portions 82 and 82 and the housing portion 83 within an area surrounded by the dashed line labeled with a reference numeral 5B are parts for the switch 5B.

As illustrated in FIG. 3B, the placement portion 82 includes a columnar contact portion 821, a support wall portion 822 surrounding an outer circumference of the contact portion 821 over the entire circumference, and a stopper portion 823 connected to a lower end of the contact portion 821.

The contact portion 62 on the movable body 6 side is placed on an upper end of the contact portion 821. The stopper portion 823 is a columnar portion disposed concentrically with the contact portion 821. The stopper portion 823 is formed with an outer diameter D823 smaller than that of the contact portion 821.

The support wall portion 822 extends from a boundary portion between the contact portion 821 and the stopper portion 823 toward the printed circuit board 35. The support wall portion 822 connects the contact portion 821 and the base portion 81. The support wall portion 822 is inclined in such a direction that an inner diameter R822 is increased as it moves away from the contact portion 821 and toward the printed circuit board 35. The support wall portion 822 holds the contact portion 821 at a position away from the printed circuit board 35.

When an operating force directed toward the printed circuit board 35 is input to the movable body 6, the contact portion 821 pressed by the placement portion 82 is displaced in a direction approaching the printed circuit board 35 while deforming the support wall portion 822. The contact portion 821 is displaced toward the printed circuit board 35 up to a position in which the stopper portion 823 contacts the printed circuit board 35.

When the operating force acting on the movable body 6 is released, the placement portion 82 is displaced in a direction away from the printed circuit board 35 by a restoring force of the support wall portion 822.

The support wall portion 822 applies to the movable body 6 a biasing force in a direction to return the movable body 6 placed on the placement portion 82 to an initial position before displacement.

In the present embodiment, since the movable body 6 that is displaced in the axis X direction in conjunction with the operation of the operated portion 51 is placed on the placement portions 82 and 82, the user can feel an operational feeling (a reaction force) when the operated portion 51 is pressed.

As illustrated in FIG. 2, the switch 5B located next to the switch 5A is the swinging switch.

The basic configuration of the switch 5B is substantially the same as that of the switch 5A except for the detailed shape of the movable body 6.

As illustrated in FIG. 5, the switch 5B differs from the switch 5A in a direction in which the magnet 10 and the magnetic force sensor 7 face each other. The facing direction of the magnet 10 and the magnetic force sensor 7 in the switch 5A is a direction (a horizontal direction in the figure) in which the switches 5A to 5D are arranged, whereas in the switch B, the facing direction of the magnet 10 and the magnetic force sensor 7 is a direction (the vertical direction in the figure) orthogonal to the direction in which the switches 5A to 5D are arranged.

However, the positional relationship between the magnet 10 and the magnetic force sensors 7 illustrated in FIG. 6 is maintained in the switch 5B as well.

As illustrated in FIG. 5, the first wall portions 611 and 611 of the movable body 6 of the switch 5B are longer than the first wall portions 611 and 611 of the switch 5A. Then, the contact portions 62 and 62 are provided on the second wall portion 612.

In the second wall portion 612, the contact portions 62 and 62 are arranged with an interval therebetween and are placed on the placement portions 82 and 82 of the cover member 8.

Figure 8:
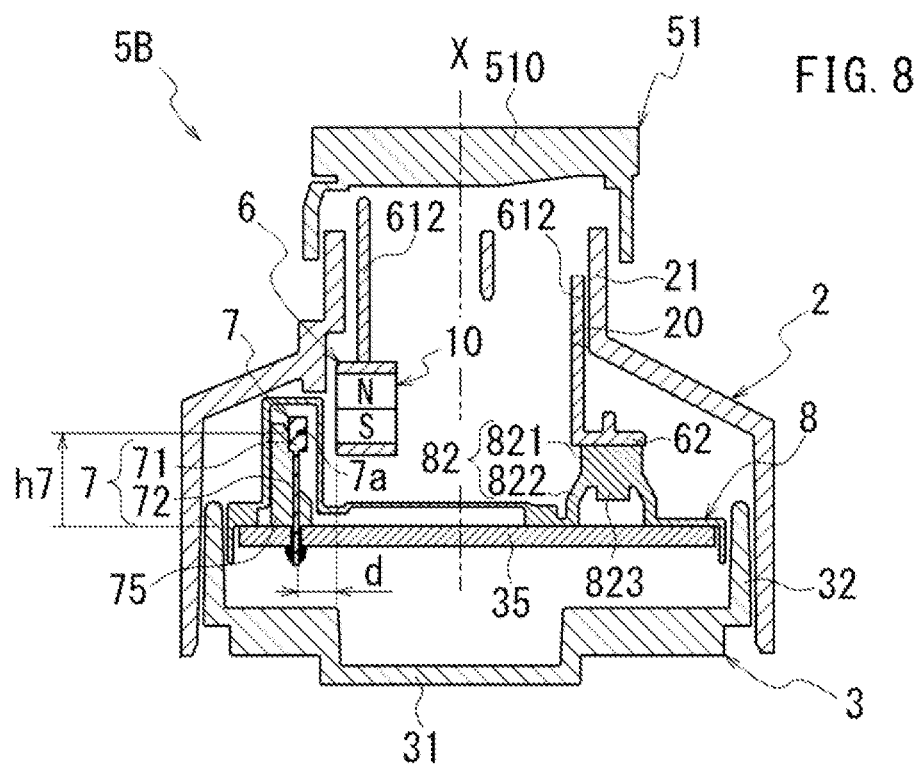
FIG. 8 is a cross-sectional view of the switch device.

FIG. 8 is a cross-sectional view of the switch device 1. FIG. 8 schematically illustrates a cross-section of the switch 5B of the switch device 1 taken along a line A-A in FIG. 5.

Figure 9:
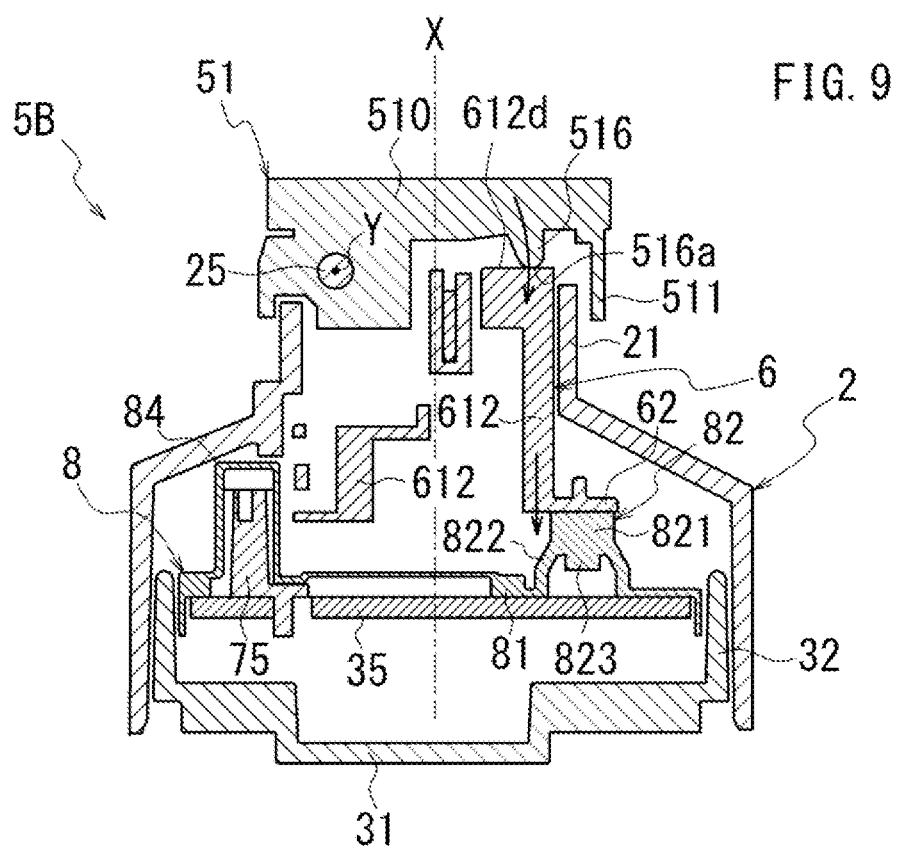
FIG. 9 is a cross-sectional view of the switch device.

FIG. 9 is a cross-sectional view of the switch device 1. FIG. 9 schematically illustrates a cross-section of the switch 5B of the switch device 1 taken along a plane B in FIG. 2. FIG. 9 is a diagram for explaining a displacement of the operated portion 51 around an axis Y and a displacement of the movable body 6 in the axis X direction in conjunction with the operation of the operated portion 51.

As illustrated in FIG. 5, the three magnetic force sensors 7 (7A, 7B, and 7C) are prepared for one magnet 10 in the switch 5B as well. The magnetic force sensors 7 (7A, 7B, and 7C) are supported by the common support 75.

As illustrated in FIG. 8, the leg portion 72 of each of the magnetic force sensors 7 (7A, 7B, and 7C) penetrates the printed circuit board 35 and is soldered to the back surface of the printed circuit board 35.

In this state, the detection surface 7a of each of the magnetic force sensors 7 (7A, 7B, and 7C) is disposed at the position away from the printed circuit board 35 by the height h7.

As illustrated in FIG. 6B, the magnetic force sensors 7 (7A, 7B, and 7C) of the switch 5B also include the magnetic force sensors 7A and 7C provided with the detection surface 7a of the detection portion 71 facing the magnet 10, and the reversed magnetic force sensor 7B with the detection surface 7a facing away from the magnet 10.

The detection surface 7a of each of the magnetic force sensors 7 (7A, 7B, and 7C) is positioned on a straight line Ln parallel to the facing surface 101 (the surface) of the magnet 10. The detection surface 7a is disposed at the position away from the facing surface 101 (the surface) of the magnet 10 by the distance d.

As illustrated in FIG. 6B, the magnetic force sensors 7 (7A, 7B, and 7C) of the switch 5B are arranged at predetermined intervals along the straight line Ln. The straight line Ln is a straight line in the alignment direction of the magnetic force sensors 7 (7A, 7B, and 7C). As viewed from the facing direction of the magnetic force sensors 7 and the magnet 10, the magnetic force sensors 7 (7A, 7B, and 7C) are arranged in the positional relationship that overlaps the magnet 10. Therefore, the magnetic force sensors 7 (7A, 7B, and 7C) are arranged so as not to protrude in the direction of the straight line Ln beyond the range of the width W10 of the magnet 10.

As illustrated in FIG. 9, the operated portion 51 of the switch 5B is rotatably supported by a support shaft 25 on the case 2 side. In the pressed portion 510, the axis Y, which is a rotation axis of the operated portion 51, is located above the second wall portion 612 that supports the magnet 10.

The pressed portion 510 has a leg portion 516 on a lower surface thereof on the printed circuit board 35 side. The leg portion 516 is located above the second wall portion 612 that supports the contact portion 62. The leg portion 516 protrudes downward on the printed circuit board 35 side from the pressed portion 510. A tip 516a of the leg portion 516 contacts an upper end 612d of the second wall portion 612.

The movable body 6 having the second wall portion 612 is supported by the peripheral wall portion 21 of the case 2 so as to be movable in the axis X direction.

When the operating force toward the printed circuit board 35 acts on the pressed portion 510 of the switch 5B, the pressed portion 510 rotates about the axis Y. Then, the leg portion 516 of the pressed portion 510 moves the movable body 6 downward toward the printed circuit board 35.

That is, rotation of the pressed portion 510 about the axis Y is converted into displacement of the movable body 6 in the axis X direction. Thus, the contact portion 821 pressed by the contact portion 62 of the movable body 6 is displaced in the direction approaching the printed circuit board 35 while deforming the support wall portion 822. The contact portion 821 is displaced toward the printed circuit board 35 up to the position in which the stopper portion 823 contacts the printed circuit board 35.

When the operating force acting on the pressed portion 510 of the switch 5B is released, the placement portion 82 of the cover member 8 is displaced in the direction away from the printed circuit board 35 by the restoring force of the support wall portion 822. Thus, the movable body 6 placed on the placement portion 82 is displaced in the direction away from the printed circuit board 35, and returns to an initial position before the operated portion 51 rotates about the axis Y, and a posture of the operated portion 51 is held at the initial position.

Figure 10:
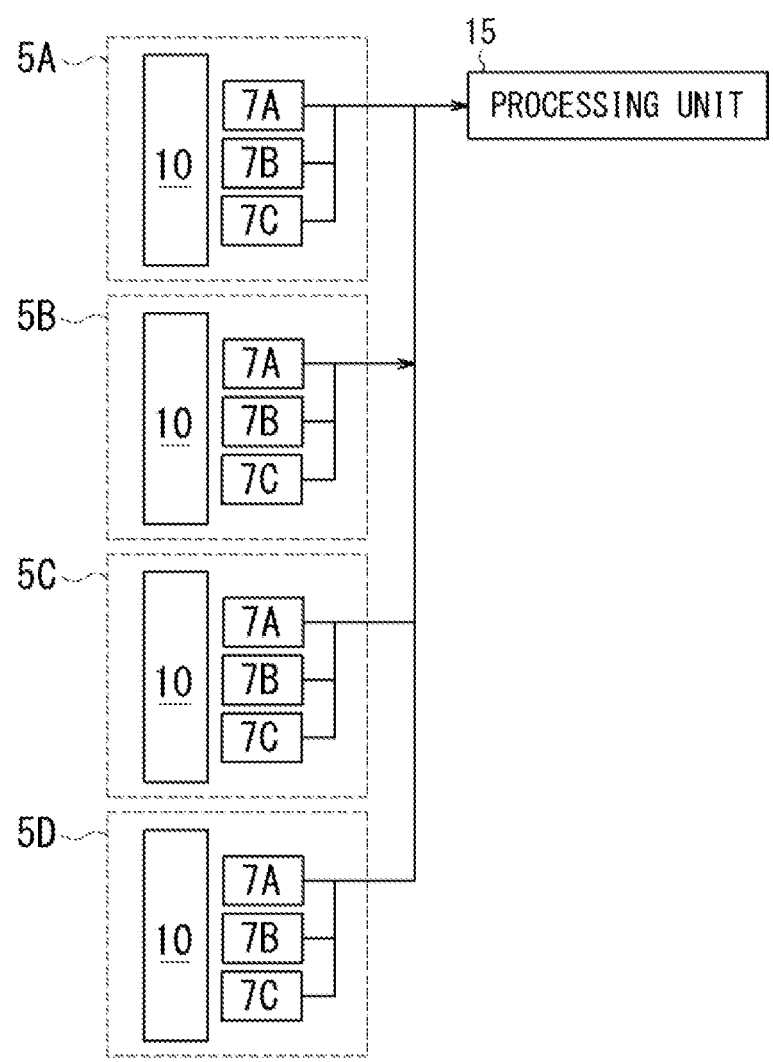
FIG. 10 is a schematic configuration diagram of an output signal processing device.

FIG. 10 is a schematic configuration diagram of an output signal processing device 15.

The processing device 15 performs processing (operation determination processing) of determining whether each of the switches 5 (5A to 5D) is operated on the basis of output signals of the magnetic force sensors 7 (7A, 7B, and 7C) of the switches 5 (5A to 5D). Furthermore, the processing device 15 performs processing (failure determination processing) of determining whether there is a failure in the magnetic force sensors 7 (7A, 7B, and 7C) on the basis of the output signals of the magnetic force sensors 7 (7A, 7B, and 7C).

The "failure" in the magnetic force sensors 7 (7A, 7B, and 7C) is not limited to a case where the magnetic force sensor 7 is simply out of order. A failure when the output signal of the magnetic force sensor 7 is not an expected output signal, such as a case where the magnetic force sensor 7 is tilted from its original position is included in "failure".

Since the magnetic force sensor 7 is provided with the detection portion 71 at an upper end of the leg portion 72, a center of gravity is high and tends to tilt. Therefore, although the support 75 is used to suppress tilting of the magnetic force sensor 7, the magnetic force sensor 7 may be tilted even when supported by the support 75. When the magnetic force sensor 7 is tilted, the magnetic force sensor 7 outputs an output signal different from the expected output signal.

In the present embodiment, not only a failure of the magnetic force sensor 7 itself, but also the tilting of the magnetic force sensor 7, which may affect detection, can be detected as "there is a failure" by the failure determination processing.

Figure 11A:
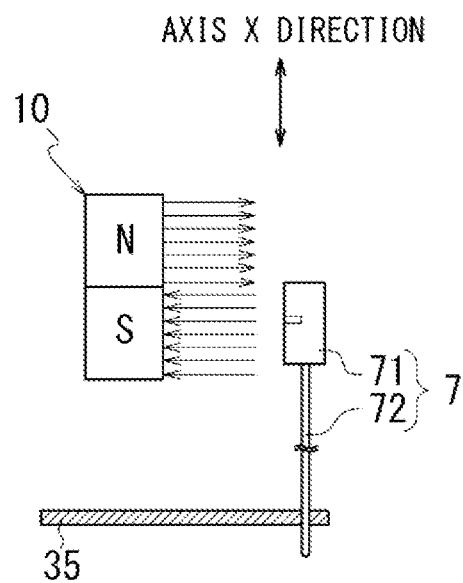
FIG. 11 is a diagram for explaining a change in the positional relationship between the magnet and the magnetic force sensor associated with an operation of a switch.
Figure 11B:
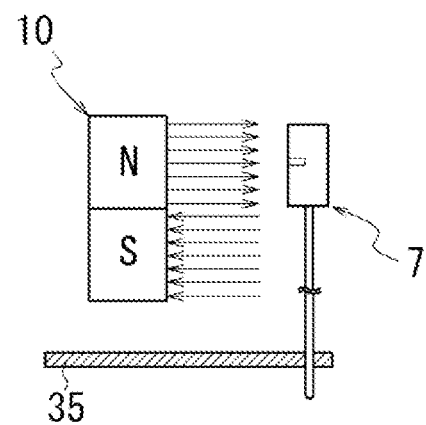
Figure 12:
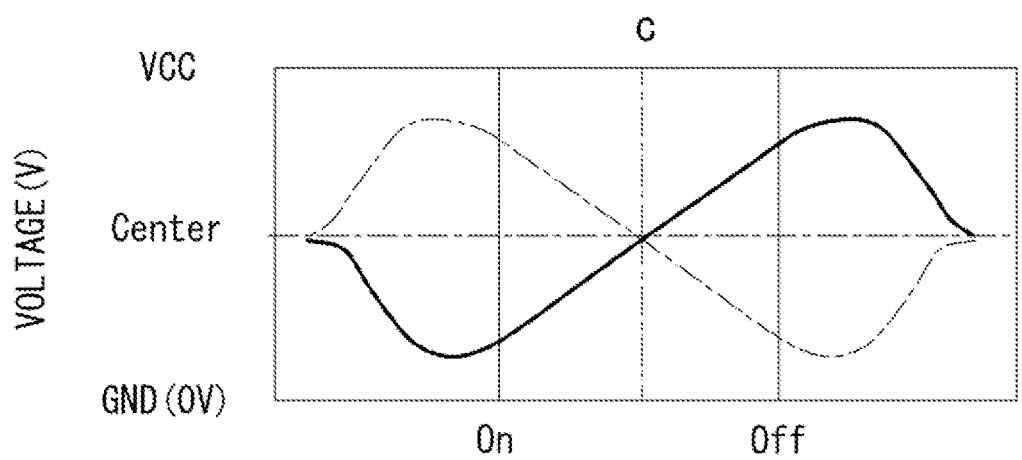
FIG. 12 is a diagram for explaining an output waveform of the magnetic force sensor associated with the operation of the switch.

FIGS. 11A and 11B are diagrams illustrating changes in the positional relationship between the magnetic force sensor 7 and the magnet 10 when the switch 5 is pushed. FIG. 12 is a diagram for explaining a change in the output signal of the magnetic force sensor 7 when the switch 5 is pushed.

In the switch device 1 of the present embodiment, the magnet 10 attached to the movable body 6 is displaced downward toward the printed circuit board 35 in the axis X direction as the operated portion 51 is pushed. In the switch device 1, the magnetic force sensors 7 (7A to 7C) detects a change in magnetic force when the magnet 10 is displaced in the axis X direction, and based on the detection result, it is determined whether the switch is operated.

As described above, one magnet 10 and three magnetic force sensors 7 (7A, 7B, and 7C) are prepared for each of the switches 5 (5A to 5D).

The magnetic force sensors 7 (7A to 7C) detect a magnetic force component in the facing direction (a horizontal direction in FIG. 11A) of the magnetic force sensors 7 (7A to 7C) and the magnet 10, and output the output signals corresponding to a magnitude of the detected magnetic force.

Specifically, the magnetic force sensors 7 (7A to 7C) output voltage values determined according to the magnitude of the magnetic force to the processing device 15 (MPU) as the output signals.

When one of the switches 5 (5A to 5D) (see FIG. 2) is operated, the output signals are input to the processing device 15 from the three magnetic force sensors 7 (7A to 7C) assigned to the operated switch.

As illustrated in FIG. 11A, when the movable body 6 is displaced in the axis X direction as the operated portion 51 is pushed, the magnet 10 attached to the movable body 6 is also displaced in the axis X direction.

Specifically, the magnet 10 is displaced from an initial position illustrated in FIG. 11A to an operating position illustrated in FIG. 11B.

Then, the magnetic force detected by the detection portion 71 of the magnetic force sensor 7 changes as the magnet 10 is displaced.

As illustrated in FIG. 12, when the magnet 10 is stationary at the initial position, the magnetic force sensor 7 is disposed to face the S pole. In this state, the output signal (an output voltage value) of the magnetic force sensor 7 is a median value (Center).

From here, when the magnet 10 is displaced toward the operating position, the output signal of the magnetic force sensor 7 changes, and at a timing when a boundary between the S pole and the N pole crosses a front face of the detection portion 71, the output signal of the magnetic force sensor 7 changes from one side to the other side of the median value. This is because a direction of the magnetic force is reversed between when the S pole is located in front of the detection surface 7a of the magnetic force sensor 7 and when the N pole is located in front of the detection surface 7a of the magnetic force sensor 7.

That is, before and after a timing C at which the boundary between the S pole and the N pole crosses the front face of the detection portion 71, an output waveform is vertically inverted with respect to the median value (see a thick line in the figure).

Here, a waveform indicated by a solid line in FIG. 12 is an output waveform of the magnetic force sensors 7A and 7C provided with the detection surface 7a of the detection portion 71 facing the magnet 10. A waveform indicated by a one-dot chain line in FIG. 12 is an output waveform of the magnetic force sensor 7B with the detection surface 7a facing away from the magnet 10.

The magnetic force sensor 7B has the detection surface 7a facing away from the magnet 10. That is, the magnetic force sensor 7B is disposed in an orientation opposite to that of the magnetic force sensors 7A and 7C.

Then, although the magnitude of the magnetic force detected along with the displacement of the magnet 10 is the same as that of the magnetic force sensors 7A and 7C, a phase of the output waveform obtained is inverted. That is, as illustrated in FIG. 12, the output waveform is vertically inverted with respect to the median value (see the one-dot chain line in the figure).

Figure 13:
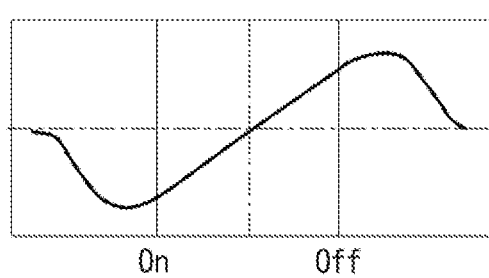
FIG. 13 is a diagram for explaining setting of a magnetic sensor group.
Figure 13:
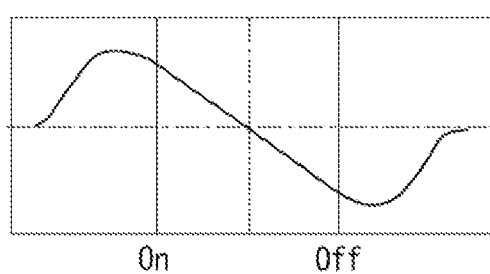
Figure 13:
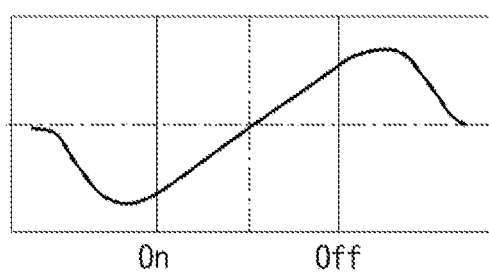

The output signals forming three output waveforms illustrated in FIG. 13 are input to the processing device 15 from the magnetic force sensors 7 (7A, 7B, and 7C). Here, a top of FIG. 13 is the output waveform of the magnetic force sensor 7A, a middle of FIG. 13 is the output waveform of the magnetic force sensor 7B, and a bottom of FIG. 13 is the output waveform of the magnetic force sensor 7C.

When performing the failure determination processing, the processing device 15 sets a magnetic force sensor group P (detection element group) including a pair of magnetic force sensors in the three magnetic force sensors 7A, 7B, and 7C.

In the case of FIG. 13, as an example, two sensor groups of a first sensor group P1 (detection element group) including the magnetic force sensor 7A and the magnetic force sensor 7B, and a second sensor group P2 (detection element group) including the magnetic force sensor 7B and the magnetic force sensor 7C are set.

The processing device 15 compares the output signal of the magnetic force sensor 7A (the waveform illustrated at the top of FIG. 13) and the output signal of the magnetic force sensor 7B (the waveform illustrated in the middle of FIG. 13) included in the first sensor group P1, and compares the output signal of the magnetic force sensor 7B (the waveform illustrated in the middle of FIG. 13) and the output signal of the magnetic force sensor 7C (the waveform illustrated at the bottom of FIG. 13) included in the second sensor group P2.

Since the magnetic force sensor 7A and the magnetic force sensor 7B have the detection surfaces 7a of the detection portions 71 facing in opposite directions, the output waveforms are symmetrical about the median value. Therefore, in the case where there is no failure in the magnetic force sensor 7A and the magnetic force sensor 7B, when the output waveform of one of the magnetic force sensors is inverted with respect to the median value, the output waveform after inversion and the output waveform of the other magnetic force sensor overlap each other.

When the output waveform after inversion does not match the non-inverted output waveform of the other magnetic force sensor, it means that one of the magnetic force sensors 7A and 7B has a failure.

When the output waveform after inversion matches the non-inverted output waveform of the other magnetic force sensor, it means that both the magnetic force sensor 7A and the magnetic force sensor 7B do not have a failure.

When both the magnetic force sensors (magnetic force sensors 7A and 7B) included in the first sensor group P1 and the magnetic force sensors (magnetic force sensors 7B and 7C) included in the second sensor group P2 do not have a failure, the processing device 15 determines that there is no failure in the magnetic force sensors 7 (7A to 7C).

Thus, the processing device 15 performs the operation determination processing to determine whether the switch is operated on the basis of the output signals of the magnetic force sensors 7 (7A to 7C).

As an example, the processing device 15 determines that the switch is operated when the output signals of the magnetic force sensors 7 (7A to 7C) changes across the median value (Center).

When at least one of the magnetic force sensors (the magnetic force sensors 7A and 7B) included in the first sensor group P1 and the magnetic force sensors (the magnetic force sensors 7B and 7C) included in the second sensor group P2 has a failure, the processing device 15 performs the operation determination processing on the basis of the output signals of the magnetic force sensors other than the magnetic force sensor having the failure to determine whether the switch is operated.

Here, when a "failure" is recognized in a comparison result of the magnetic force sensors (magnetic force sensors 7A and 7B) included in the first sensor group P1, and no "failure" is recognized in a comparison result of the magnetic force sensors (magnetic force sensors 7B and 7C)

included in the second sensor group P2, it is determined that the magnetic force sensor 7A included in the first sensor group P1 has a failure.

This is because it can be recognized from a determination result of the second sensor group P2 that the magnetic force sensor 7B does not have a failure since the magnetic force sensor 7B is commonly included in the first sensor group P1 and the second sensor group P2.

Further, when a "failure" is recognized in the comparison result of the magnetic force sensors (magnetic force sensors 7A and 7B) included in the first sensor group P1, and a "failure" is recognized in the comparison result of the magnetic force sensors (magnetic force sensors 7B and 7C) included in the second sensor group P2, it is determined that the magnetic force sensor 7B has a failure.

This is because the magnetic force sensor 7B is commonly included in the first sensor group P1 and the second sensor group P2.

In this case, a third sensor group P3 including the magnetic force sensor 7A and the magnetic force sensor 7C may be newly set, and after recognizing that there is no "failure" in a comparison result of the magnetic force sensors (magnetic force sensors 7A and 7C) included in the set third sensor group P3, it may be determined that the magnetic force sensor 7B has a "failure".

When no "failure" is recognized in the comparison result of the magnetic force sensors (magnetic force sensors 7A and 7B) included in the first sensor group P1, and a "failure" is recognized in the comparison result of the magnetic force sensors (magnetic force sensors 7B and 7C) included in the second sensor group P2, it is determined that the magnetic force sensor 7C included in the second sensor group P2 has a failure.

In this way, when no failure is recognized in any of the magnetic force sensors 7 (7A to 7C), the processing device 15 determines whether the switch is operated on the basis of the output signals of the magnetic force sensors 7 (7A to 7C).

When a failure is found in any of the magnetic force sensors 7 (7A to 7C), since a magnetic force sensor having a failure can be identified by determination using combinations of the magnetic force sensors 7 (7A to 7C), it is determined whether the switch is operated on the basis of the output signals of the remaining magnetic force sensors 7 having no failure. This makes it possible to appropriately determine whether or not the switch is operated.

In the above-described embodiment, a case where the three magnetic force sensors 7 are assigned to one switch is exemplified. Four or more magnetic force sensors 7 may be assigned to the one switch. In this case, at least one magnetic force sensor 7 is placed with the detection surface 7a facing away from the magnet 10. Then, the magnetic force sensor groups may be set to include the reversed magnetic force sensor 7, and it may be determined whether there is a failure for each magnetic force sensor group. Thus, it is also possible to more appropriately determine whether there is a failure in the magnetic force sensor 7.

In the above-described embodiment, a case is exemplified where the processing device 15 sets a plurality of sensor groups P (detection element groups) including a pair of magnetic force sensors in the three magnetic force sensors 7A, 7B, and 7C when performing the failure determination processing.

For example, when there are a plurality of magnetic force sensors, a sensor group Pa including a pair of magnetic force sensors is set first, and when it is determined that there is a failure in the magnetic force sensor included in the set sensor group, a new sensor group Pb including one magnetic force sensor included in the sensor group Pa and another magnetic force sensor may be set, and it may be determined whether there is a failure in a magnetic force sensor included in the new sensor set Pb.

Thus, it is also possible to identify the magnetic force sensor having a failure, thereby determining whether the switch is operated on the basis of the output waveform of the magnetic force sensor having no failure.

In the above-described embodiment, a case where it is determined whether or not there is a failure by comparing the output waveforms of the pair of magnetic force sensors is exemplified, but it may be determined whether there is a failure by calculating a difference $\Delta V$ between the output voltage of the magnetic force sensor 7 and the median value (Center) of the output voltage and by comparing a difference $\Delta V$ of one magnetic force sensor and a difference $\Delta V$ of the other magnetic force sensor included in a pair of magnetic force sensor groups.

As described above, the switch device 1 according to the present embodiment has the following configuration.

(1) The switch device 1 includes:
    a movable body 6 that is displaced in the axis X direction in conjunction with the operation of the operated portion 51;
    a magnet 10 provided on the movable body 6; and
    a plurality of magnetic force sensors 7 (detection elements) arranged facing the magnet 10.

The plurality of magnetic force sensors 7 include a detection element with the detection surface 7a facing the magnet 10 and a reversed detection element with the detection surface 7a facing away from the magnet 10.

The total number of the plurality of magnetic force sensors 7 is at least three.

With this configuration, at least one magnetic force sensor 7B is disposed with the detection surface 7a facing away from the magnet 10. The magnetic force sensors 7A and 7C arranged with the detection surface 7a facing the magnet 10 and the magnetic force sensor 7B arranged with the detection surface 7a facing away from the magnet 10 have inverted phases of the output signals (FIGS. 12 and 13).

Therefore, the magnetic force sensors 7A and 7C arranged with the detection surface 7a facing the magnet 10 and the magnetic force sensor 7B arranged with the detection surface 7a facing away from the magnet 10 have different output signal phases.

Then, by comparing the output signals having different phases, it can be recognized that one of the magnetic force sensors 7A and 7C arranged with the detection surface 7a facing the magnet 10 and the magnetic force sensor 7B arranged with the detection surface 7a facing away from the magnet 10 has a failure. Since at least three magnetic force sensors 7 are provided, it is possible to identify which magnetic force sensor has a failure by changing the combination for comparing the output signals. It can be determined whether the operated portion 51 is operated can be determined from the output signals of the magnetic force sensors other than the identified magnetic force sensor.

Therefore, even when any of the magnetic force sensors 7 has a failure, detection of whether the operated portion 51 is operated, that is, detection of operation of the switch 5 is not affected.

Thus, robustness against failure of the magnetic force sensor 7 can be improved.

(2) The movable body 6 has the magnet 10 attached to a portion facing the magnetic force sensor 7.

As viewed from the axis X direction, the magnet 10 has a width W10 in a first direction (the alignment direction in FIG. 6) orthogonal to the axis X direction.

The plurality of magnetic force sensors 7 are provided to be aligned in the axis X direction, and arranged in the first direction with the same distance d from a surface (the facing surface 101) of the magnet 10.

With this configuration, intensities of the output signals of the magnetic force sensors 7 (7A to 7C) are uniform, so that the output signals of the magnetic force sensors 7 can be easily compared.

In particular, when the magnet 10 and the magnetic force sensor 7 (7A to 7C) are provided in a positional relationship in which the magnet 10 and the magnetic force sensor 7 (7A to 7C) overlap each other as viewed from the facing direction of the magnet 10 and the magnetic force sensors 7 (7A to 7C), by arranging the magnetic force sensors 7 (7A to 7C) side by side in the first direction, the distance d between the magnetic force sensors 7 (7A to 7C) and the surface (facing surface 101) of the magnet 10 can be made uniform. This facilitates arrangement of the magnetic force sensors 7 (7A to 7C), so that the intensities of the output signals of the magnetic force sensors 7 (7A to 7C) can be more easily uniformed.

(3) The magnet 10 is provided in a magnetic pole orientation in which one side in the axis X direction is the N pole and the other side is the S pole.

Positions of the plurality of magnetic force sensors 7 in the axis X direction are such that the plurality of magnetic force sensors 7 are provided to face one S pole of magnetic poles of the magnet 10 when the operated portion 51 is not operated, and the plurality of magnetic force sensors 7 are provided to face the other N pole of the magnetic poles of the magnet 10 when the operated portion 51 is operated.

With this configuration, since change tendency and intensity of the output signals of the magnetic force sensors 7 when the operated portion 51 is operated are uniform, the output signals of the magnetic force sensors 7 can be easily compared. Note that the magnet 10 may be configured to be provided in a magnetic pole orientation such that one side in the axis X direction is the S pole and the other side is the N pole.

(4) The switch device 1 includes the processing device 15 (processing unit) for the output signal of the magnetic force sensor 7.

The processing device 15 sets magnetic force sensor groups P1 and P2 (detection element groups) including a pair of magnetic force sensors 7 in the plurality of magnetic force sensors 7, and by comparing the output signals of the pair of magnetic force sensors included in the magnetic force sensor pairs P1 and P2, it is determined whether there is a failure in the detection elements included in the set magnetic force sensor group.

With this configuration, it is possible to quickly detect the presence of the magnetic force sensor 7 having a failure.

(5) The magnetic force sensor group including the pair of magnetic force sensors 7 includes the magnetic force sensor 7A with the detection surface 7a facing the magnet 10 and the reversed magnetic force sensor 7B with the detection surface 7a facing away from the magnet 10.

With this configuration, the output waveform of the magnetic force sensor 7A and the output waveform of the magnetic force sensor 7B are waveforms having opposite phases. Thus, the presence of the magnetic force sensor 7 having a failure can be quickly detected by comparing the output waveforms having different phases.

(6) The processing device 15 identify a detection element having a failure as follows.

When there is a failure in the pair of magnetic force sensors included in the set magnetic force sensor group P1, in another magnetic force sensor group P2 including a magnetic force sensor included in the magnetic force sensor group P1 that is determined to have a failure and another detection element, the processing device 15 determines whether there is a failure in the magnetic force sensor included in the other magnetic force sensor group P2 to identify the magnetic force sensor having a failure.

With this configuration, it is possible to quickly identify the magnetic force sensor having a failure.

(7) The movable body 6 is placed on the cover member 8 (elastic member).

The cover member 8 applies a biasing force to the movable body 6 so that the operated portion 51 to which the movable body 6 is connected is disposed in an initial position.

With this configuration, it is possible to give an operational feeling to the operation of the operated portion 51.

(8) The movable body 6 is supported by the case 2 so as to be movable in the X-axis direction.

The operated portion 51 is connected to the movable body 6.

With this configuration, it is possible to directly displace the movable body 6 by pressing the operated portion 51.

(9) The movable body 6 is supported by the case 2 so as to be movable in the axis X direction.

The operated portion 51 is provided to be rotatable about the axis Y in the case 2.

The operated portion 51 has the leg portion 516 radially outward of the axis Y as viewed from the axis Y direction.

The leg portion 516 is placed on the upper end 612d of the movable body 6.

When the operated portion 51 rotates about the axis Y due to the operating force acting on the operated portion 51, the leg portion 516 displaces the movable body 6 in the axis X direction.

With this configuration, even in the case of the switch 5B in which the operated portion 51 swings, the magnet 10 attached to the movable body 6 is displaced in the axial direction in conjunction with the operation of the operated portion 51 of the switch 5B.

Thus, even in the case of the switch 5B having the swinging type operated portion 51, the operation of the switch 5B can be appropriately detected.

Although the embodiments and modifications of the present invention have been described above, the present invention is not limited thereto, and can be appropriately modified within the scope of the technical idea of the invention.

The invention claimed is:

1. A switch device, comprising:
a movable body that is displaced in an axial direction in conjunction with an operation of an operated portion;
a magnet provided on the movable body; and
a plurality of magnetic force sensors arranged facing the magnet;
wherein the plurality of magnetic force sensors includes a first magnetic force sensor with a detection surface facing the magnet and a reversed second magnetic force sensor with a detection surface facing away from the magnet;
wherein a total number of the plurality of magnetic force sensors is at least three;
wherein the magnet is attached to a portion of the movable body facing the plurality of magnetic force sensors;

wherein the magnet has a width in a first direction orthogonal to the axial direction as viewed from the axial direction;

wherein the plurality of magnetic force sensors are arranged in the first direction such that the plurality of magnetic force sensors are aligned with one another relative to the axial direction and are disposed a same distance from a surface of the magnet;

wherein the magnet is arranged in a magnetic pole orientation in which one side in the axial direction is an N pole and the other side is an S pole; and wherein the plurality of magnetic force sensors are positioned in the axial direction such that the plurality of magnetic force sensors face a first magnetic pole of the magnet when the operated portion is not operated and face a second magnetic pole of the magnet when the operated portion is operated.

2. The switch device according to claim 1, further comprising a processing unit for output signals of the plurality of magnetic force sensors, wherein:

the processing unit sets a magnetic force sensor group including a pair of magnetic force sensors of the plurality of magnetic force sensors; and the switch device is configured to determine whether there is a failure in the pair of magnetic force sensors included in the set magnetic force sensor group via comparing output signals of the pair of magnetic force sensors included in the set magnetic force sensor group.

3. The switch device according to claim 2, wherein the set magnetic force sensor group including the pair of magnetic force sensors includes the first magnetic force sensor with the detection surface facing the magnet and the second magnetic force sensor with the detection surface facing away from the magnet.

4. The switch device according to claim 3, wherein:

when there is a failure in the pair of detection elements magnetic force sensors included in the set magnetic force sensor group, in another magnetic force sensor group including (i) a magnetic force sensor included in the set magnetic force sensor group that is determined to have the failure and (ii) another magnetic force sensor of the plurality of magnetic force sensors, the switch device is configured to determine whether there is a failure in the magnetic force sensor included in the another magnetic force sensor group to identify a magnetic force sensor having a failure.

5. The switch device according to claim 1, wherein:

the movable body is disposed on an elastic member; and the elastic member applies a biasing force to the movable body such that the operated portion to which the movable body is connected is disposed in an initial position.

6. The switch device according to claim 5, wherein:

the movable body is supported by a case such that the movable body is movable in the axial direction; and the operated portion is connected to the movable body.

7. The switch device according to claim 5, wherein:

the movable body is supported by a case such that the movable body is movable in the axial direction;

the operated portion is rotatable about a shaft orthogonal to the axial direction; and the operated portion includes a leg portion placed on the movable body radially outward of the shaft.

* * * * *